(12) United States Patent
Lu et al.

(10) Patent No.: US 10,182,207 B2
(45) Date of Patent: Jan. 15, 2019

(54) HANDLING NUISANCE IN TELECONFERENCE SYSTEM

(71) Applicant: Dolby Laboratories Licensing Corporation, San Francisco, CA (US)

(72) Inventors: Taoran Lu, Santa Clara, CA (US); Hariharan Ganapathy-Kathirvelu, Santa Clara, CA (US); Peng Yin, Ithaca, NY (US); Glenn N. Dickins, Como (AU); Xuejing Sun, Beijing (CN)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 15/544,114

(22) PCT Filed: Feb. 16, 2016

(86) PCT No.: PCT/US2016/018013
§ 371 (c)(1),
(2) Date: Jul. 17, 2017

(87) PCT Pub. No.: WO2016/133870
PCT Pub. Date: Aug. 25, 2016

(65) Prior Publication Data
US 2017/0353696 A1    Dec. 7, 2017

Related U.S. Application Data

(60) Provisional application No. 62/130,928, filed on Mar. 10, 2015.

(30) Foreign Application Priority Data

Feb. 17, 2015   (CN) .......................... 2015 1 0086639

(51) Int. Cl.
*H04N 7/15* (2006.01)
*H04M 3/56* (2006.01)
(Continued)

(52) U.S. Cl.
CPC .......... *H04N 7/152* (2013.01); *H04L 65/403* (2013.01); *H04L 65/80* (2013.01); *H04M 3/56* (2013.01); *H04N 7/147* (2013.01); *H04N 7/15* (2013.01)

(58) Field of Classification Search
None
See application file for complete search history.

(56) References Cited

U.S. PATENT DOCUMENTS 6,219,640 B1   4/2001  Basu
6,353,662 B1   3/2002  Foladare
(Continued)

FOREIGN PATENT DOCUMENTS

CN   103325386    9/2013
JP   H04-23589    1/1992

OTHER PUBLICATIONS

O'Donovan A. et al., "Real Time Capture of Audio Images and their use with Video", Applications of Signal Processing to Audio and Acoustics, 2007 IEEE Workshop on, pp. 10-13, Oct. 21-24, 2007.
Volfin I. et al., "Dominant speaker identification for multipoint videoconferencing", Electrical & Electronics Engineers in Israel (IEEEI), 2012 IEEE 27th Convention of, pp. 1-4, Nov. 14-17, 2012.

*Primary Examiner* — Creighton Smith

(57) ABSTRACT

The disclosure relates to handling nuisance in teleconference system. An endpoint device (400) for use in a teleconference includes an acquiring unit (401), a judging unit (402), a controller (403) and a processing unit (404). The acquiring unit acquires a media stream for presentation in the teleconference, and receives information from another device. The information includes a first estimation on whether the media stream is a nuisance to the teleconference. As the nuisance (Continued)

to a teleconference, audio or video signals are perceived by users as actually not relevant to the conference session or causing unpleasant feeling or confusion. The judging unit decides whether the media stream is the nuisance at least based on the information. The controller controls the processing of the media stream to degrade or suppress the presentation of the media stream in case that the media stream is decided as the nuisance. The processing unit processes the media stream under the control of the controller.

18 Claims, 9 Drawing Sheets

(51) Int. Cl.
*H04N 7/14* (2006.01)
*H04L 29/06* (2006.01)

(56) References Cited

U.S. PATENT DOCUMENTS

| | | | |
|---|---|---|---|
| 7,219,062 | B2 | 5/2007 | Colmenarez |
| 7,269,252 | B2 | 9/2007 | Eran |
| 7,472,063 | B2 | 12/2008 | Nefian |
| 7,587,318 | B2 | 9/2009 | Seshadri |
| 7,860,718 | B2 | 12/2010 | Lee |
| 8,218,751 | B2 | 7/2012 | Hepworth |
| 8,237,764 | B1 | 8/2012 | Chen |
| 8,471,889 | B1 | 6/2013 | Lee |
| 8,612,211 | B1 | 12/2013 | Shires |
| 8,635,066 | B2 | 1/2014 | Morrison |
| 9,373,343 | B2 | 6/2016 | Dickins |
| 2005/0228673 | A1 | 10/2005 | Nefian |
| 2011/0093273 | A1 | 4/2011 | Lee |
| 2014/0282111 | A1 | 9/2014 | Gurbag |

HANDLING NUISANCE IN TELECONFERENCE SYSTEM

CROSS-REFERENCE TO RELATED APPLICATIONS

This application claims priority to Chinese Patent Application No. 201510086639.0 Filed Feb. 17, 2015, and U.S. Provisional Application No. 62/130,928, each of which is hereby incorporated by reference it its entirety.

TECHNICAL FIELD

The present invention relates generally to teleconferencing. More specifically, embodiments of the present invention relate to endpoint devices and servers which can handle nuisance in teleconference systems.

BACKGROUND

A teleconference is the live exchange of information among several persons and machines (also called endpoint devices) remote from one another but linked by a communications system based on a communications network such as Public Telephone Network, Integrated Services Digital Network, Internet Protocol Network, etc. The communications system may support the teleconference by providing one or more of the following: audio, video, and/or data services by one or more means, such as telephone, computer, telegraph, teletypewriter, radio, and television.

Audio or video (A/V) signals in a media stream (audio, video or both) are usually called as nuisance if they can be perceived by the users but are actually not relevant to the teleconference or can cause unpleasant feeling or confusion. The nuisance may also be called as nuisance to the teleconference. The nuisance may come from the signal capturing process (i.e. from the camera and the microphone). For example, the nuisance can be a purely audio noise signal. Various techniques have been proposed to handle nuisances in the teleconference. For example, U.S. Pat. No. 7,269,252 B2, "METHOD AND APPARATUS FOR IMPROVING NUISANCE SIGNALS IN AUDIO/VIDEO CONFERENCE" discloses a system to allow a conferee being defined as a nuisance source to respond to an automatic nuisance decision of a Multipoint Control Unit (MCU). For example, a conferee placing a conference on hold may generate on hold music, which may be identified by a nuisance detector. The nuisance detector sends an indication of the nuisance condition to a control unit in the MCU. The control unit mutes the signal coming from this conferee and sends an Interactive Voice Response (IVR) message to the conferee. The message may inform the conferee that he has been muted and requests the conferee for example to press one of a plurality of touch tone keys depending on his situation. For instance, the conferee can select particular keys if he is returning from the hold condition, if he is experiencing a noisy line/environment and needs to reduce the sensitivity of the nuisance detector algorithm, or if he wishes to disable the nuisance detector algorithm.

SUMMARY

According to an embodiment of the present invention, there is provided an endpoint device for use in a teleconference. The endpoint device includes an acquiring unit, a judging unit, a controller and a processing unit. The acquiring unit can acquire a media stream for presentation in the teleconference, and receive information from another device. The information includes a first estimation on whether the media stream is a nuisance to the teleconference. The judging unit can decide whether the media stream is the nuisance at least based on the information. The controller can control the processing of the media stream to suppress the presentation of the media stream in case that the media stream is decided as the nuisance. The processing unit can process the media stream under the control of the controller.

According to an embodiment of the present invention, there is provided a method of handling nuisance in an endpoint device for use in a teleconference. According to the method, a media stream for presentation in the teleconference is acquired, and information is received from another device. The information includes a first estimation on whether the media stream is a nuisance to the teleconference. It is decided whether the media stream is the nuisance at least based on the information. The processing of the media stream is controlled to suppress the presentation of the media stream in case that the media stream is decided as the nuisance. The media stream is processed under the control.

According to an embodiment of the present invention, there is provided a server for use in a teleconference. The server includes a receiver, a voting unit and a transmitter. The receiver can receive an estimation on whether a media stream is a nuisance to the teleconference from each of at least one endpoint device which receives the media stream. The voting unit can calculate a final estimation as the voting result by considering the estimation as a vote by each of the at least one endpoint device. The transmitter can transmit the final estimation to each endpoint device in the teleconference.

According to an embodiment of the present invention, there is provided a method of handling nuisance in a server for use in a teleconference. According to the method, an estimation on whether a media stream is a nuisance to the teleconference is received from each of at least one endpoint device which receives the media stream. A final estimation is calculated as the voting result by considering the estimation as a vote by each of the at least one endpoint device. The final estimation is transmitted to each endpoint device in the teleconference.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF DRAWINGS

The present invention is illustrated by way of example, and not by way of limitation, in the figures of the accompanying drawings and in which like reference numerals refer to similar elements and in which.

DETAILED DESCRIPTION

Figure 1:
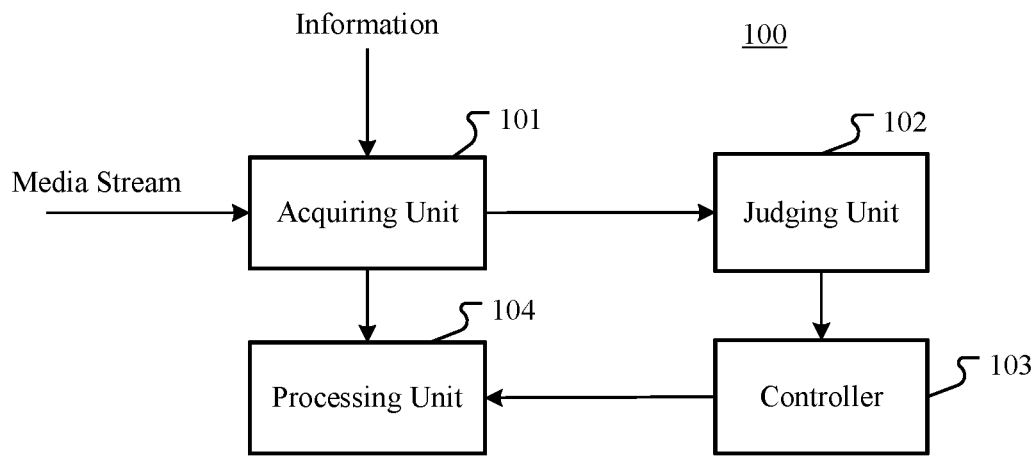
FIG. 1 is a block diagram illustrating an example of an endpoint device for use in a teleconference according to an embodiment of the present invention.

The embodiments of the present invention are below described by referring to the drawings. It is to be noted that, for purpose of clarity, representations and descriptions about those components and processes known by those skilled in the art but unrelated to the present invention are omitted in the drawings and the description.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wired line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As the nuisance to a teleconference, audio or video signals are perceived by users as actually not relevant to the conference session or causing unpleasant feeling or confusion. The nuisance may come from a signal capturing process executed on an endpoint device joining in the teleconference, for example, from a camera and/or a microphone of the endpoint device. The nuisance may be a purely audio noise signal, such as high environment noise, or a purely video signal, such as a person talking to other people not in the conference session with his microphone muted. The nuisance may also include an audio signal and a visual signal, such as a people making irrelevant talk but forgetting to mute. The nuisance may also come from signal compression and/or transmission over an error-prone channel. For example, a poor compressed A/V stream, an error-corrupted A/V stream, or a high latency A/V stream may also become a nuisance.

Whether a media stream captured by an endpoint device (called as "producer" with respect to the captured media stream) is a nuisance to a teleconference can ultimately depend on experience of conferees in the teleconference when the media stream is presented through endpoint devices of the conferees. For example, even if the media stream is not detected as a nuisance at the producing endpoint device, there is a possibility that the media stream is detected as a nuisance at an endpoint device which receives the media stream for presentation (called as "consumer" with respect to the received media stream). This may be caused by, for example, degradation in signal quality due to compression or transmission loss. Feedbacks from endpoint devices which receive a media stream can reflect more accurate information on the nuisance nature of the media stream. Considering feedbacks from the endpoint devices can improve accuracy in judging whether the media stream is a nuisance to the teleconference.

For convenience of description, various nuisance estimations are defined as follows and will be used in the following description.

$N\_f$: a nuisance estimation of a media stream, which is calculated based on feedbacks from endpoint devices regarding the media stream and represents a final voting result by the endpoint devices on the nuisance nature of the media stream;

$N\_ac$: a nuisance estimation of an audio stream, which is calculated by analyzing the audio stream via a nuisance detecting method;

$N\_vc$: a nuisance estimation of a video stream, which is calculated by analyzing the video stream via a nuisance detecting method;

$N\_d$: a nuisance estimation of a media stream, which is calculated by analyzing the media stream via a nuisance detecting method. In case of the media stream including an audio stream and a video stream, $N\_d$ is calculated based on $N\_ac$ and $N\_vc$;

$N\_c$: a nuisance estimation of a media stream, which is calculated based on $N\_f$ and $N\_d$ and represents a total estimation on the nuisance nature of the media stream.

FIG. 1 is a block diagram illustrating an example of an endpoint device 100 for use in a teleconference according to an embodiment of the present invention.

As illustrated in FIG. 1, the endpoint device 100 includes an acquiring unit 101, a judging unit 102, a controller 103 and at least one processing unit 104.

Figure 2A:
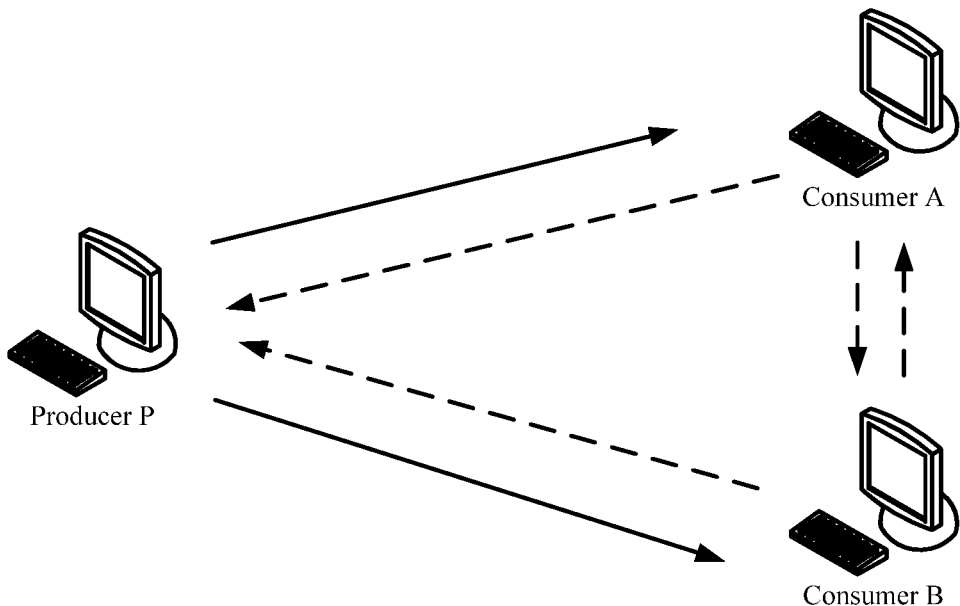
FIG. 2A is a schematic view for illustrating a scenario without a server.
Figure 2B:
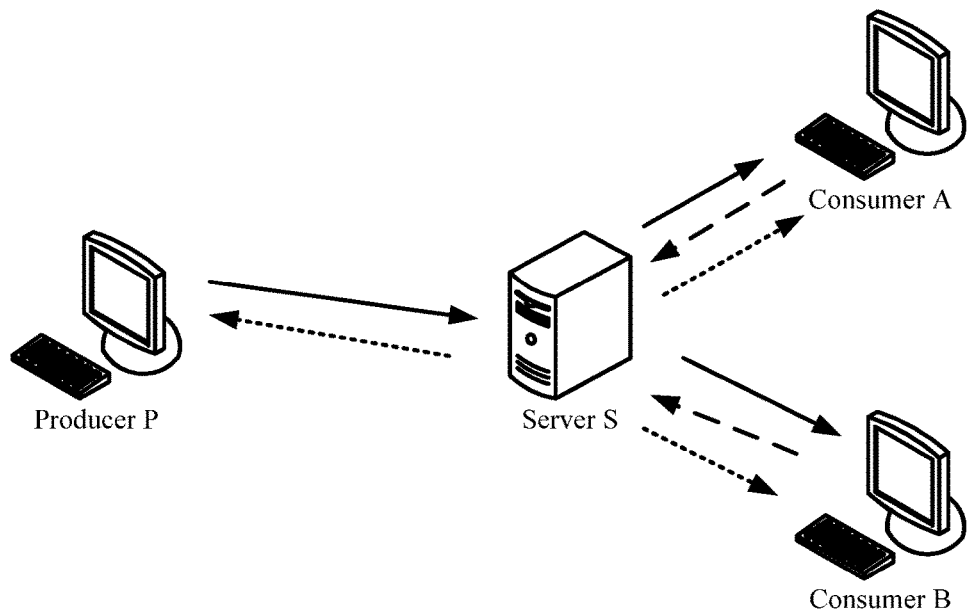
FIG. 2B is a schematic view for illustrating a scenario with a server.

The endpoint device 100 may be a producer or a consumer for a media stream. FIG. 2A is a schematic view for illustrating a scenario without a server (called as Scenario A hereafter). In Scenario A, a media stream captured by a producer such as producer P is distributed to consumers such as consumers A and B (data flows represented by arrowed solid lines). If a consumer such as consumers A and B derives a feedback from the received media stream, it sends the feedback to the producer and other consumers (data flows represented by arrowed dashed lines). FIG. 2B is a schematic view for illustrating a scenario with a server (called as Scenario B hereafter). In Scenario B, a media stream captured by a producer such as producer P is uploaded to a server S, and the server S distributes the media stream to consumers such as consumers A and B (data flows represented by arrowed solid lines). If a consumer such as consumers A and B derives a feedback from the received media stream, it sends the feedback to the server S (data flows represented by arrowed dashed lines), and the server S distributes information including the feedback to the producer and other consumers (data flows represented by arrowed dotted lines).

The acquiring unit 101 is configured to acquire a media stream for presentation in the teleconference. In case that the endpoint device 100 is the producer for the media stream, such as the producer P in FIG. 2A or FIG. 2B, the media stream may be an audio stream, a video stream or both captured by the endpoint device 100. In this case, the acquiring unit 101 may include an input device such as a camera and a microphone for capturing the media stream. Alternatively, in case that the endpoint device 100 is a consumer for the media stream, such as the consumer A or B in FIG. 2A or FIG. 2B, the media stream may be an audio stream, a video stream or both captured by an endpoint device, such as the producer P in FIG. 2A or FIG. 2B, other than the endpoint device 100. In this case, the acquiring unit 101 may receive the media stream transmitted from the endpoint device as the producer.

The acquiring unit 101 is further configured to receive information from another device. The information comprises estimation (i.e., feedback) on whether the media stream is a nuisance to the teleconference. For example, in Scenario A or B, the endpoint device 100 is the producer P, and the acquiring unit 101 of the endpoint device 100 receives feedbacks from consumers such as consumers A and B directly, or receives feedbacks of consumers such as consumers A and B from the server S. As another example, in Scenario A or B, the endpoint device 100 is the consumer A, and the acquiring unit 101 of the endpoint device 100 receives feedbacks from other consumers such as consumer B directly, or receives feedbacks of other consumers such as consumer B from the server S.

The judging unit 102 is configured to decide whether the media stream is the nuisance at least based on the information acquired by the acquiring unit 101. The information includes estimations on the nuisance nature of the media stream made by other endpoint devices which receive the media stream for presentation. These estimations may be considered as votes by the endpoint devices. If an estimation indicates a higher possibility that the media stream is a nuisance, the judging unit 102 more likely decides the media stream as the nuisance. If more estimations indicate that the media stream is likely a nuisance, the judging unit 102 more likely decides the media stream as the nuisance. A final estimation N_f may be calculated as the voting result of these votes. For example, the estimations may be hard estimations (e.g., 1 represents nuisance, 0 represents non-nuisance) on whether the media stream is a nuisance or not, and a final estimation N_f may be made by the judging unit 102 from the hard estimations according to a voting algorithm such as a majority voting algorithm. The estimations may also be soft estimations representing the possibility that the media stream is a nuisance, and a final estimation N_f may be derived by the judging unit 102 from the soft estimations to reflect an overall nuisance evaluation of the other endpoint devices regarding the media stream. As an example, the final estimation N_f can be calculated as an average of the soft estimations. The final estimation N_f can indicate the possibility that the media stream is a nuisance. By comparing the final estimation N_f with a threshold, the judging unit 102 can make the decision. Alternatively, the judging unit 102 may directly make the decision based on the hard or soft estimations in a similar manner.

The controller 103 is configured to control the processing of the media stream to suppress the presentation of the media stream in case that the media stream is decided as the nuisance. Because the nuisance to a teleconference is not relevant to the conference session or can cause unpleasant feeling or confusion, suppressing the presentation of the nuisance can mitigate the effect of the nuisance on conferees' experience. Examples of the suppression on the presentation includes, but not limited to, disabling the presentation, degrading at least one of presenting characteristics and discarding the media stream. A particular suppression may be specified in advance so that the controller 103 can apply it if the media stream is decided as the nuisance. Alternatively, the suppressions may be associated with different levels of confidence of the decision or different types of the media stream. For example, the suppression of degrading is associated with a lower level of confidence, the suppression of disabling is associated with a middle level of confidence, and the suppression of discarding is associated with a higher level of confidence. As another example, it is possible to only associate the suppression of degrading with an audio stream. In case of the media stream including an audio stream and a video stream, it is possible to associate the suppression of degrading or no suppression with the audio stream, and associate one or more suppression with the video stream. If a media stream is decided as the nuisance, the controller 103 can determine the associated suppression to apply to the media stream.

Depending on the media stream to be suppressed, the control of the controller 103 may involve various processing units of the endpoint device 100. For example, processing an audio stream may involve a decoding unit for decoding the audio stream, an adapting unit for processing the audio signal in the audio stream to be suitable for outputting via a loudspeaker, and the loudspeaker for outputting the audio signal. As another example, processing a video stream may involve a decoding unit for decoding the video stream, a rendering unit for processing the video signal in the video stream to be suitable for outputting via a display, and the display for outputting the video signal.

Also, depending on the suppression to be applied, the control of the controller 103 may involve controlling various processing units of the endpoint device 100. For example, suppression of disabling the presentation of an audio stream may involve controlling the loudspeaker to mute-on. Suppression of disabling the presentation of a video stream may involve controlling the rendering unit to close the window corresponding to the video stream or to display other content than the video stream in the window. Suppression of discarding an audio stream or a video stream may involve disabling the corresponding decoding unit. Suppression of degrading at least one characteristic of an audio stream may involve controlling the adapting unit to reduce the volume of the audio stream, or to move the location of the audio stream in the sound field far away that of the active speaker. Suppression of degrading at least one characteristic of a video stream may involve controlling the rendering unit to reduce the size of the window for presenting the video stream, to move the window to a position far away from the window corresponding to the active speaker, or to convert the video stream from color video to monochrome video.

The processing unit 104 is configured to process the media stream under the control of the controller 103. Depending on the media stream to be suppressed and the suppression to be applied, the processing unit 104 may include various processing units which are involved in the control of the controller 103.

Figure 3:
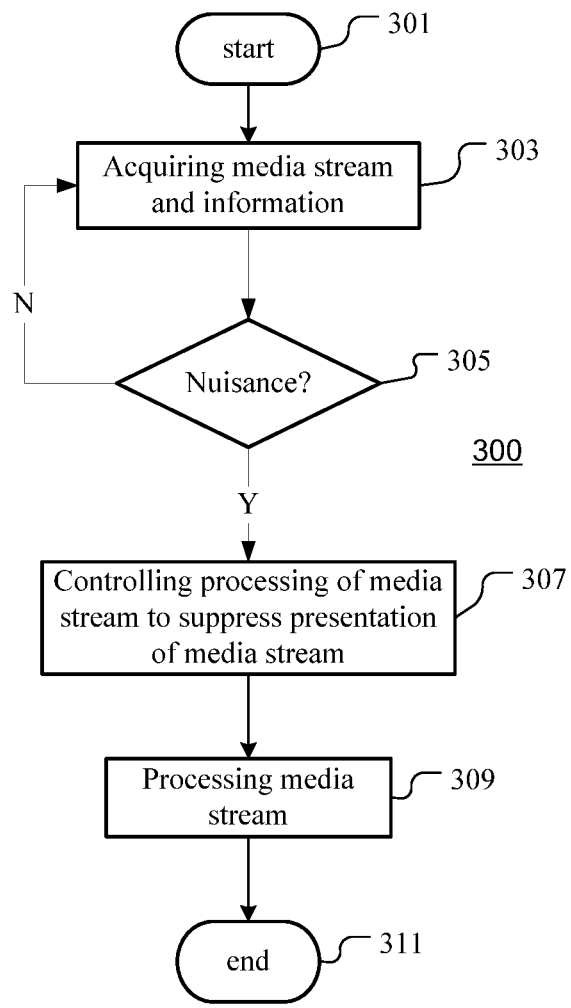
FIG. 3 is a flow chart illustrating an example of a method of handling nuisance in an endpoint device for use in a teleconference.

FIG. 3 is a flow chart illustrating an example of a method 300 of handling nuisance in an endpoint device for use in a teleconference.

As illustrated in FIG. 3, the method 300 starts at step 301. At step 303, a media stream for presentation in the teleconference is acquired, and information is acquired from another device. The information includes estimation on whether the media stream is a nuisance to the teleconference. At step 305, it is decided whether the media stream is the nuisance at least based on the information. If the media stream is not decided as the nuisance, the method 300 returns to step 303. If the media stream is decided as the nuisance, then at step 307, the processing of the media stream is controlled to suppress the presentation of the media stream. At step 309, the media stream is processed under the control determined at step 307. The method 300 ends at step 311.

Figure 4:
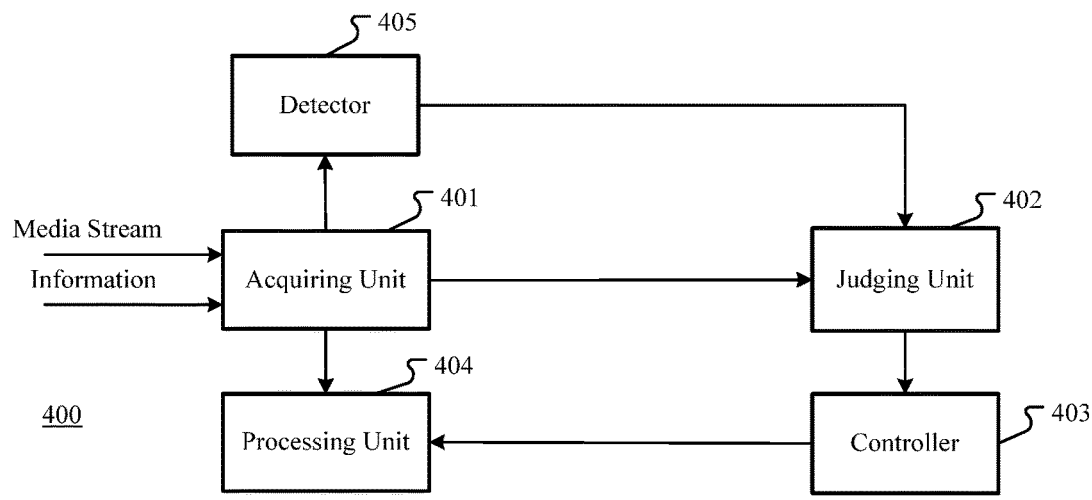
FIG. 4 is a block diagram illustrating an example of an endpoint device for use in a teleconference according to an embodiment of the present invention.

FIG. 4 is a block diagram illustrating an example of an endpoint device 400 for use in a teleconference according to an embodiment of the present invention.

As illustrated in FIG. 4, the endpoint device 400 includes an acquiring unit 401, a judging unit 402, a controller 403, at least one processing unit 404 and a detector 405. The acquiring unit 401, controller 403, and processing unit 404 have the same functions as the acquiring unit 101, the controller 103 and the processing unit 104 respectively, and will not be described in detail here. With respect to the media stream acquired by the acquiring unit 401, the endpoint device 400 functions as the producer, that is to say, the media stream is captured by the endpoint device 400.

The detector 405 is configured to calculate a direct estimation N_d on whether the media stream is a nuisance to the teleconference based on the media stream. Various methods of detecting the nuisance nature of a media stream may be used by the detector 405. For example, methods disclosed in CN 201210080977.X, "METHOD AND SYSTEM FOR SIGNAL TRANSMISSION CONTROL" may be used.

The judging unit 402 is further configured to decide whether the media stream is the nuisance at least based on the information acquired by the acquiring unit 401 and the estimation N_d. If an estimation included in the information indicates a higher possibility that the media stream is a nuisance, the judging unit 402 more likely decides the media stream as the nuisance. If more estimations in the information indicate that the media stream is likely a nuisance, the judging unit 402 more likely decides the media stream as the nuisance. If the estimation N_d indicates a higher possibility that the media stream is a nuisance, the judging unit 402 more likely decides the media stream as the nuisance. As an example, the judging unit 402 may calculate the final estimation N_f as described in connection with the judging unit 102, and calculate a total estimation N_c=f(N_f, N_d), where the function f( ) is in positive correlation relation with N_f and N_d. In an example, N_c=N_f+N_d. In another example, N_c may be calculated as a weighted sum of N_f and N_d, such as N_c=w1×N_f+w2×N_d, where w1 and w2 are weights and may respectively depend on reliability of methods of calculating N_f and N_d. By combining the feedbacks from other endpoint devices and the local detection, a more accurate nuisance detection may be achieved.

In comparison with a nuisance (called as short term nuisance) which is instant or lasts a short period of time (e.g., one or several frames), a nuisance (called long term nuisance) lasting a period of time in the order of seconds or minutes is more likely to cause unpleasant feeling or confusion. Further, such a long term nuisance is more likely to leave some effects in both the audio stream and the video stream because of its long lasting time. Therefore, a nuisance detection based on long term features from both the audio stream and the video stream can improve the accuracy in nuisance detection and the efficiency in nuisance handling. In a further embodiment of the endpoint device 400, the media stream includes an audio stream and a video stream. The detector 405 is configured to derive at least one feature from segments in order of seconds or minutes of the audio stream and the video stream. Various features for depicting characteristics of audio or video signals over a long interval may be used. For example, the long term features described in CN 201210080977.X, "METHOD AND SYSTEM FOR SIGNAL TRANSMISSION CONTROL" may be used. The detector 405 is further configured to calculate the estimation N_d based on the derived feature. Various techniques for pattern recognition may be used to calculate the estimation N_d based on the derived feature. For example, a classifier for nuisance may be trained in advance and used to calculate the estimation N_d based on the derived feature.

Alternatively, the detector 405 is configured to identify at least one event occurring in the media stream. The detector 405 is further configured to calculate the estimation N_d based on the identified event.

Besides the long term feature for classification, some events occurring in the media stream may be used to estimate the nuisance nature of the media stream. For example, such events may include meeting certain conditions such as:

a) The audio has been muted over a predetermined period of time and the result of video scene analysis (VSA), e.g., face detection, lip detection, long term motion analysis, on the video stream shows that there is an unrecognized or nuisance activity (e.g., someone is facing at the camera, is speaking, etc.)in the video;

b) The audio has been muted over a predetermined period of time and the result of video quality assessment (VQA) on the video stream is lower than a predetermined quality level (e.g., the video signal is blurry, unstable, dark, low contrast, saturated, without people in it);

c) The result of audio scene analysis (ASA), e.g., detecting short bursts, keyboard activity, background speech, non-stationary noise, on the audio stream shows that there is an unrecognized or nuisance activity in the audio, and the result of VSA on the video stream shows that there is an unrecognized or nuisance activity in the video;

d) The result of ASA on the audio stream shows that there is an unrecognized or nuisance activity in the audio, and the result of VQA on the video stream is lower than a predetermined quality level;

e) The result of ASA on the audio stream shows that there is an unrecognized or nuisance activity in the audio, and the loudspeaker of the endpoint device which captures the audio stream is turned off;

f) The video is off, and the result of ASA on the audio stream shows that there is highly likely an unrecognized or nuisance activity in the audio;

g) The video is off, the audio is on, but the loudspeaker of the endpoint device which captures the audio stream is turned off;

h) The audio is on, and the result of VSA on the video stream shows that there is no one speaking in the video;

If condition a), b) or h) is met, the video stream is likely a nuisance. If condition c), d) or e) is met, the video stream is likely a nuisance, and the audio stream is also likely a nuisance. If condition f) or g) is met, the audio stream is also likely a nuisance. Accordingly, an estimation N_vc on whether the video stream is a nuisance and an estimation N_ac on whether the audio stream is a nuisance can be calculated. The estimation N_d on the whole media stream can be calculated as a value in positive correlation relation with N_vc and N_ac. For example, N_d may be calculated as a sum or weighted sum of N_vc and N_ac.

In a further embodiment, the detector 405 is configured to derive at least one feature from segments in order of seconds or minutes of the audio stream and the video stream, and to identify at least one event occurring in the media stream. The detector 405 is further configured to calculate the estimation N_d based on the derived feature and the identified event. In this case, the estimation N_d is in positive correlation relation with the estimation calculated based on the derived feature and the estimation calculated based on the identified event.

In a further embodiment, the detector 405 is further configured to identify a verbosity state from the media stream, and to calculate the estimation N_d based on a criteria that if the verbosity state is identified, the media stream is less likely to be a nuisance. The verbosity state indicates a state where a speaker has been actively speaking over a predetermined period of time.

Figure 5:
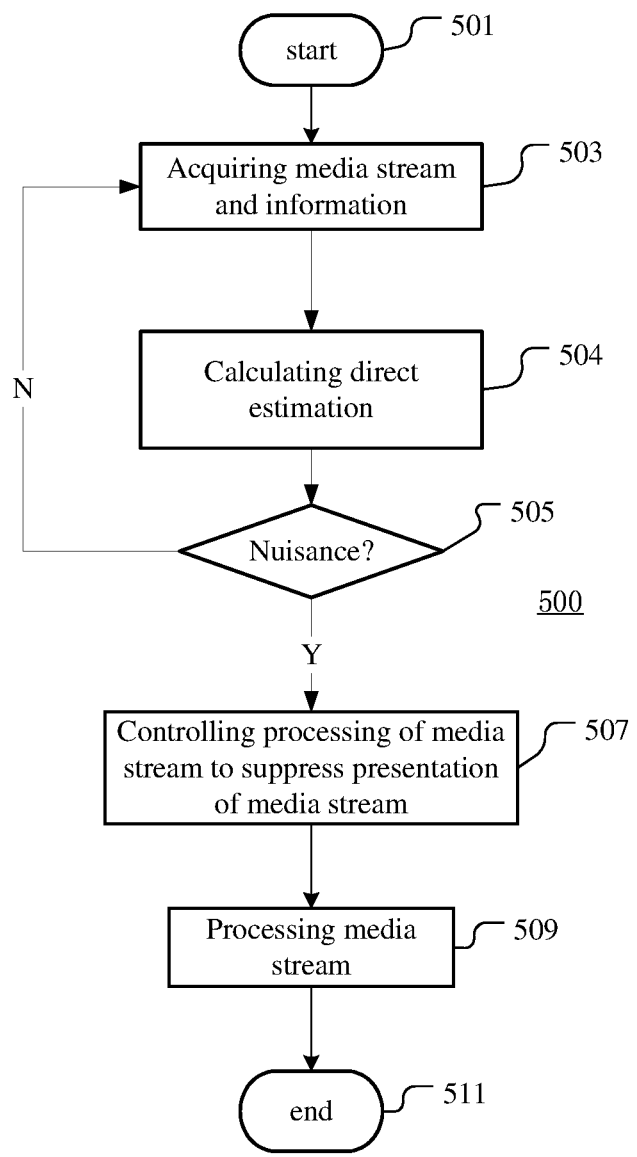
FIG. 5 is a flow chart illustrating an example of a method of handling nuisance in an endpoint device for use in a teleconference.

FIG. 5 is a flow chart illustrating an example of a method 500 of handling nuisance in an endpoint device for use in a teleconference.

As illustrated in FIG. 5, the method 500 starts at step 501. At step 503, a media stream for presentation in the teleconference is acquired, and information is acquired from another device. The information includes estimation on whether the media stream is a nuisance to the teleconference.

At step 504, a direct estimation N_d on whether the media stream is a nuisance to the teleconference is calculated based on the media stream.

At step 505, it is decided whether the media stream is the nuisance at least based on the information acquired at step 503 and the estimation N_d. If the media stream is not decided as the nuisance, the method 500 returns to step 503. If the media stream is decided as the nuisance, then at step 507, the processing of the media stream is controlled to suppress the presentation of the media stream. At step 509, the media stream is processed under the control determined at step 507. The method 500 ends at step 511.

In a further embodiment of the method 500, the media stream includes an audio stream and a video stream. The step 504 includes deriving at least one feature from segments in order of seconds or minutes of the audio stream and the video stream, and calculating the estimation N_d based on the derived feature. Alternatively, the step 504 may include identifying at least one event occurring in the media stream, and calculating the estimation N_d based on the identified event.

In a further embodiment of the method 500, the step 504 includes deriving at least one feature from segments in order of seconds or minutes of the audio stream and the video stream, and identifying at least one event occurring in the media stream. The step 504 further includes calculating the estimation N_d based on the derived feature and the identified event.

In a further embodiment of the method 500, the step 504 further includes identifying a verbosity state from the media stream, and calculating the estimation N_d based on a criteria that if the verbosity state is identified, the media stream is less likely to be a nuisance.

Figure 6:
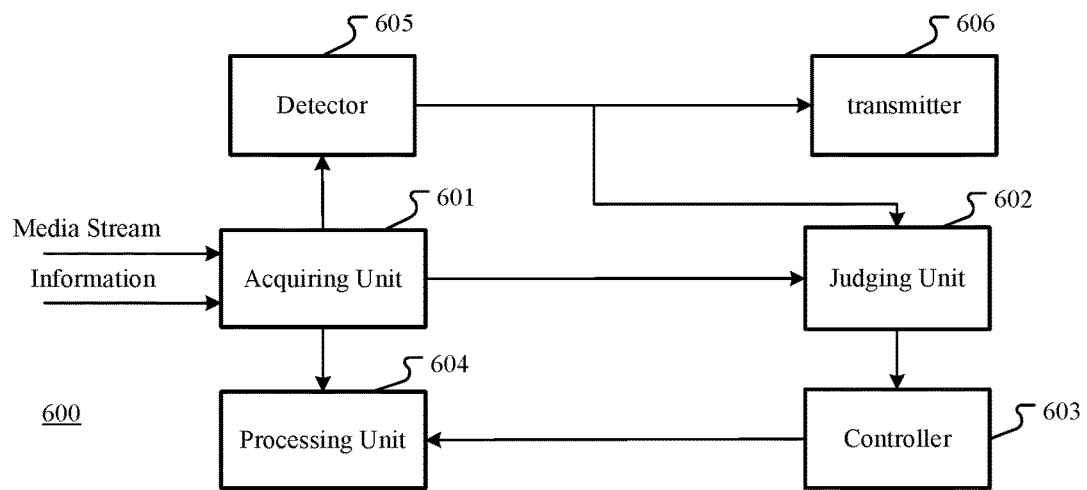
FIG. 6 is a block diagram illustrating an example of an endpoint device for use in a teleconference according to an embodiment of the present invention.

FIG. 6 is a block diagram illustrating an example of an endpoint device 600 for use in a teleconference according to an embodiment of the present invention.

As illustrated in FIG. 6, the endpoint device 600 includes an acquiring unit 601, a judging unit 602, controller 603, at least one processing unit 604, a detector 605 and a transmitter 606. The acquiring unit 601, judging unit 602, controller 603 and processing unit 604 have the same functions as the acquiring unit 401, judging unit 402, controller 403 and the processing unit 404 respectively, and will not be described in detail here. With respect to the media stream acquired by the acquiring unit 601, the endpoint device 600 functions as a consumer, that is, the media stream is captured by an endpoint device other than the endpoint device 600.

The detector 605 is configured to calculate a direct estimation N_d on whether the media stream is a nuisance to the teleconference based on at least one of the signal quality and the transmission loss of the media stream. If the signal quality is below a predetermined quality level, the media stream is likely a nuisance. If the transmission loss is higher than a predetermined level, the media stream is likely a nuisance. The direct estimation N_d is in positive correlation relation with the nuisance estimation based on the signal quality and the nuisance estimation based on the transmission loss.

The transmitter 606 is configured to transmit the estimation N_d to other devices in the teleconference as the vote for the media stream made by the endpoint device 600.

In a further embodiment of the endpoint device 600, the detector 605 may include the function of the detector 405. In this case, the detector 605 derive at least one feature from segments in order of seconds or minutes of the audio stream and the video stream and/or to identify at least one event occurring in the media stream, and to calculate the estimation N_d based on at least one of the signal quality and the transmission loss, as well as at least one of the feature and the event. The estimation N_d is in positive correlation relation with the nuisance estimation based on at least one of the signal quality and the transmission loss and the nuisance estimation based on at least one of the feature and the event.

Figure 7:
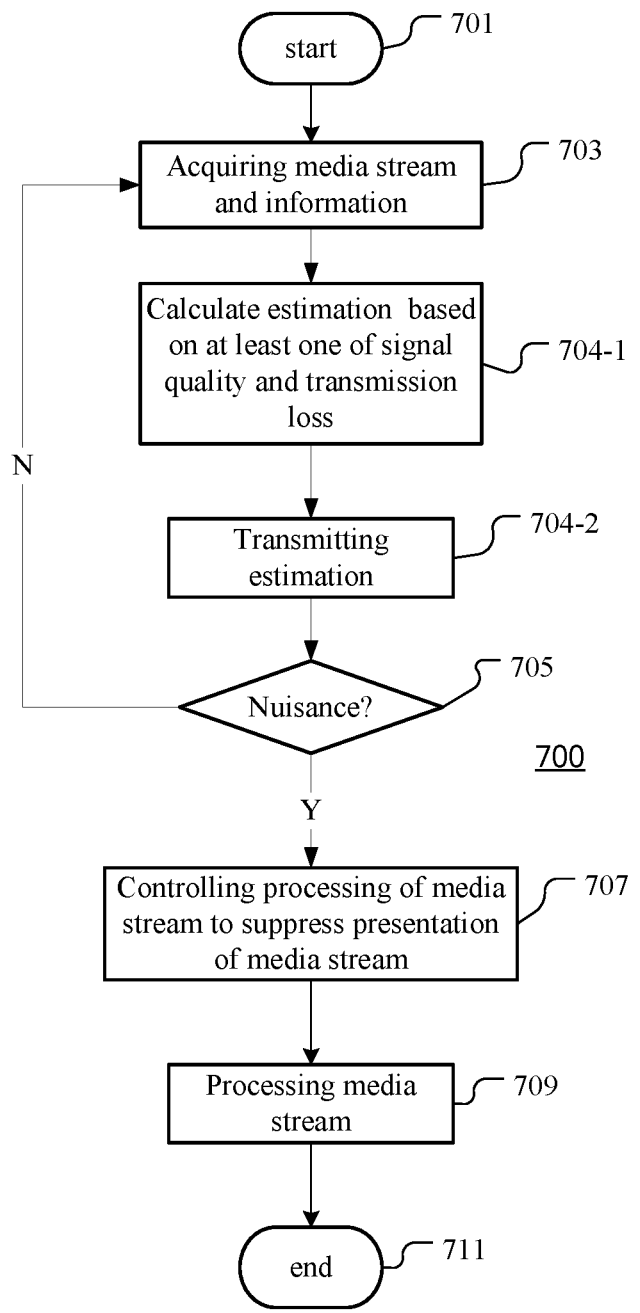
FIG. 7 is a flow chart illustrating an example of a method of handling nuisance in an endpoint device for use in a teleconference.

FIG. 7 is a flow chart illustrating an example of a method 700 of handling nuisance in an endpoint device for use in a teleconference.

As illustrated in FIG. 7, the method 700 starts at step 701. At step 703, a media stream for presentation in the teleconference is acquired, and information is acquired from another device. The information includes estimation on whether the media stream is a nuisance to the teleconference.

At step 704-1, a direct estimation N_d on whether the media stream is a nuisance to the teleconference is calculated based on at least one of the signal quality and the transmission loss of the media stream.

At step 704-2, the estimation N_d is transmitted to other devices in the teleconference as the vote for the media stream made by the endpoint device.

At step 705, it is decided whether the media stream is the nuisance at least based on the information acquired at step 703 and the estimation N_d. If the media stream is not decided as the nuisance, the method 700 returns to step 703. If the media stream is decided as the nuisance, then at step 707, the processing of the media stream is controlled to suppress the presentation of the media stream. At step 709, the media stream is processed under the control determined at step 707. The method 700 ends at step 711.

It should be noted that the step 704-2 may be executed at any time after the step 704-1, as long as the estimation N_d is up to date.

In a further embodiment of the method 700, the step 704-1 may include deriving at least one feature from segments in order of seconds or minutes of the audio stream and the video stream and/or identifying at least one event occurring in the media stream, and calculating the estimation N_d based on at least one of the signal quality and the transmission loss, as well as at least one of the feature and the event.

Various levels of nuisance detection may be deployed in endpoint devices. Different levels of nuisance detection can have different performance, and require different amount of processing resources. For example, if the computing resource is limited in some of endpoint devices, it is not necessary to deploy the function of the detector 405 (called as level-I detection for example), i.e., the function of calculating the estimation by analyzing the media stream in these endpoint devices with limited computing resource in the teleconference. In this case, these endpoint devices may include a detector for performing the function of calculating the direct estimation N_d based on at least one of the signal quality and the transmission loss of the media stream (called as level-II detection for example), which is described in connection with the detector 605, and the other endpoint devices (e.g., the endpoint device as the producer, or some endpoints have sufficient computing resource) may have the function of level-I detection. Because different levels of nuisance detection have different performance such as reliability, their nuisance estimation can be assigned with different weights. For example, the acquiring unit is further configured to acquire information on the other device's level of nuisance detection, such as level-I or level-II detection. This information can determine the weight of the other device's estimation in the decision made by the judging unit. If a level of nuisance detection is more accurate, its estimation is allocated with a higher weight.

Figure 8:
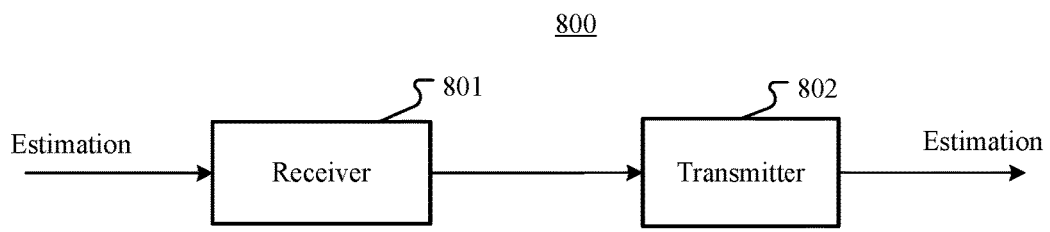
FIG. 8 is a block diagram illustrating an example of a server for use in a teleconference according to an embodiment of the present invention.

FIG. 8 is a block diagram illustrating an example of a server 800 for use in a teleconference according to an embodiment of the present invention. The server 800 is used in Scenario B. Specifically, the server 800 receives media streams from producers and forwards the received media streams to their respective consumers.

As illustrated in FIG. 8, the server 800 includes a receiver 801 and a transmitter 802.

With respect to a media stream received and forwarded by the server 800, the receiver 801 is configured to receive an estimation (e.g., the estimation N_d) on whether the media stream is a nuisance to the teleconference from an endpoint device which receives the media stream. The transmitter 802 is configured to transmit the received estimation to another endpoint device which can be the producer or other consumers of the media stream. In this way, the server 800 exchanges the estimation between one endpoint and other endpoints. Further, the transmitter 802 may also transmit the information on one device's capability of detecting the nuisance to other endpoint devices.

Figure 9:
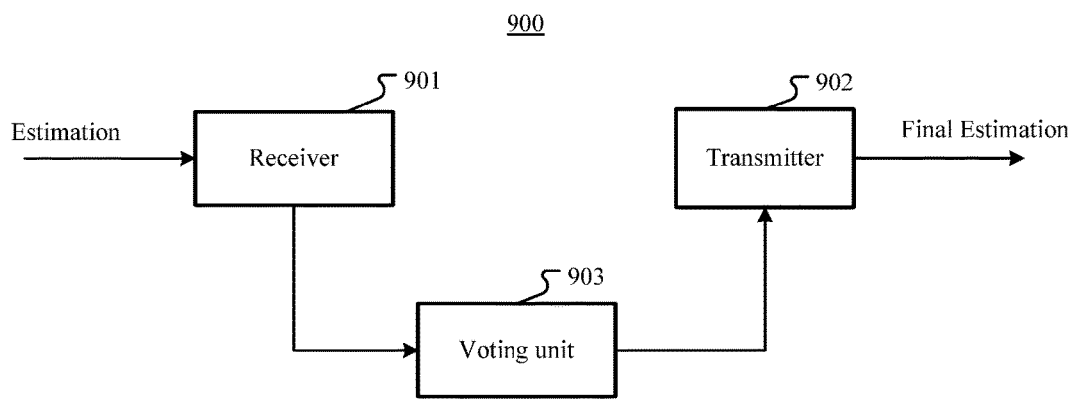
FIG. 9 is a block diagram illustrating an example of a server for use in a teleconference according to an embodiment of the present invention.

FIG. 9 is a block diagram illustrating an example of a server 900 for use in a teleconference according to an embodiment of the present invention.

As illustrated in FIG. 9, the server 900 includes a receiver 901, a transmitter 902 and a voting unit 903.

With respect to a media stream received and forwarded by the server 900, the receiver 901 is configured to receive an estimation on whether the media stream is a nuisance to the teleconference from each of at least one endpoint device which receives the media stream. The voting unit 903 is configured to calculate a final estimation N_f as the voting result by considering the estimation as a vote by each of the at least one endpoint device. In this case, the function of calculating the final estimation N_f based on feedbacks from consumers is moved from the endpoint devices to the server. Accordingly, the judging unit of the endpoint devices needs not calculating the final estimation N_f, because the information received by the acquiring unit already includes the final estimation N_f. The judging unit can directly use the final estimation N_f in making the decision.

The transmitter 902 is configured to transmit the final estimation to each endpoint device in the teleconference.

Figure 10:
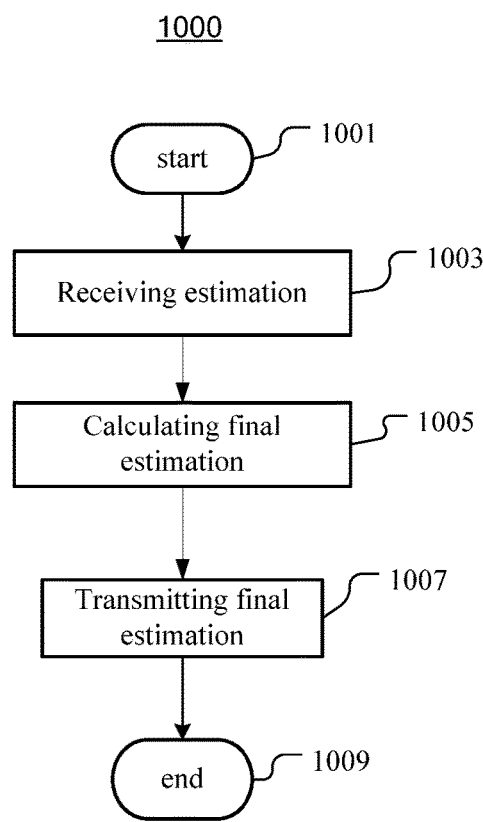
FIG. 10 is a flow chart illustrating an example of a method of handling nuisance in a server for use in a teleconference.

FIG. 10 is a flow chart illustrating an example of a method 1000 of handling nuisance in a server for use in a teleconference.

As illustrated in FIG. 10, the method 1000 starts at step 1001. At step 1003, with respect to a media stream received and forwarded by the server, an estimation on whether the media stream is a nuisance to the teleconference is received from each of at least one endpoint device which receives the media stream.

At step 1005, a final estimation N_f is calculated as the voting result by considering the estimation as a vote by each of the at least one endpoint device. In this case, the step of calculating the final estimation N_f based on feedbacks from consumers is moved from the endpoint devices to the server. Accordingly, the step of deciding whether the media stream is a nuisance needs not calculating the final estimation N_f, because the information received already includes the final estimation N_f. The final estimation N_f can be directly used in making the decision.

At step 1007, the final estimation is transmitted to each endpoint device in the teleconference. The method 1000 ends at step 1011.

Figure 11:
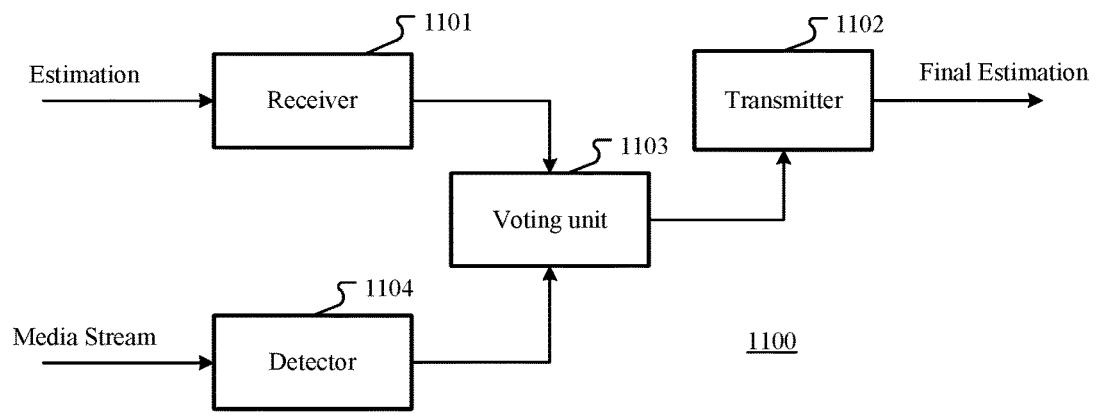
FIG. 11 is a block diagram illustrating an example of a server for use in a teleconference according to an embodiment of the present invention.

FIG. 11 is a block diagram illustrating an example of a server 1100 for use in a teleconference according to an embodiment of the present invention.

As illustrated in FIG. 11, the server 1100 includes a receiver 1101, a transmitter 1102, a voting unit 1103 and a detector 1104.

With respect to a media stream received and forwarded by the server 1100, the receiver 1101 is configured to receive an estimation on whether the media stream is a nuisance to the teleconference from each of at least one endpoint device which receives the media stream.

The detector 1104 is configured to derive at least one feature from segments in order of seconds or minutes of the audio stream and the video stream, and/or to identify at least one event occurring in the media stream. The detector 1104 is also configured to calculate an estimation on whether the media stream is a nuisance to the teleconference based on at least one of the feature and the event, as the vote by the server. In this case, the function of the detector 405, i.e., the function of calculating the estimation by analyzing the media stream in the endpoint devices in the teleconference is moved to the server.

The voting unit 1103 is configured to calculate a final estimation N_f as the voting result by considering the estimation as a vote by each of the at least one endpoint device and the server 1100. In similar to the case of the server 900, the function of calculating the final estimation N_f is moved from the endpoint devices to the server. Accordingly, the judging unit of the endpoint devices needs not calculating the final estimation N_f, because the information received by the acquiring unit already includes the final estimation N_f. The judging unit can directly use the final estimation N_f in making the decision.

The transmitter 1102 is configured to transmit the final estimation to each endpoint device in the teleconference.

In a further embodiment of the server 1100, the voting unit 1103 is further configured to acquire information on capability of detecting the nuisance of the endpoint device from which the estimation is received, and assign a weight to the estimation in the decision made by the judging unit, according to the information. This information may be provided to the server 1103 when configuring the teleconference. For example, the information may be stored in a storage device such as a database or a profile accessible to the server 1100. The information may also be reported to the server 1100 from the endpoints in response to a request by the server 1100.

In a further embodiment of the server 1100, the detector 1104 is further configured to identify a verbosity state from the media stream, and to calculate the estimation based on a criteria that if the verbosity state is identified, the media stream is less likely to be a nuisance.

Figure 12:
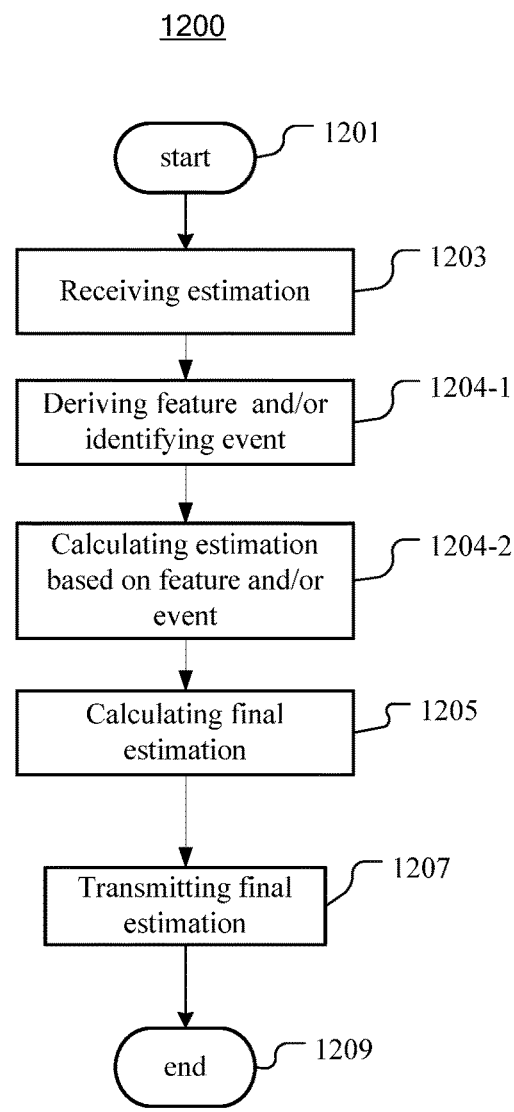
FIG. 12 is a flow chart illustrating an example of a method of handling nuisance in a server for use in a teleconference.

FIG. 12 is a flow chart illustrating an example of a method 1200 of handling nuisance in a server for use in a teleconference.

As illustrated in FIG. 12, the method 1200 starts at step 1201. At step 1203, with respect to a media stream received and forwarded by the server, an estimation on whether the media stream is a nuisance to the teleconference is received from each of at least one endpoint device which receives the media stream.

At step 1204-1, at least one feature from segments in order of seconds or minutes of the audio stream and the video stream is derived, and/or at least one event occurring in the media stream is identified.

At step 1204-2, an estimation on whether the media stream is a nuisance to the teleconference is calculated based on at least one of the feature and the event, as the vote by the server. In this case, the function of calculating the estimation by analyzing the media stream in the endpoint devices in the teleconference is moved to the server.

At step 1205, a final estimation N_f is calculated as the voting result by considering the estimation as a vote by each of the at least one endpoint device and the server. In similar to the case of the method 1000, the step of calculating the final estimation N_f based on feedbacks from consumers is moved from the endpoint devices to the server. Accordingly, the step of deciding whether the media stream is a nuisance needs not calculating the final estimation N_f, because the information received already includes the final estimation N_f. The final estimation N_f can be directly used in making the decision.

At step 1207, the final estimation is transmitted to each endpoint device in the teleconference. The method 1200 ends at step 1211.

In a further embodiment of the method 1200, the step of 1205 further includes acquiring information on capability of detecting the nuisance of the endpoint device from which the estimation is received, and assigning a weight to the estimation in the decision made by the judging unit, according to the information.

In a further embodiment of the method 1200, the step 1204-1 further includes identifying a verbosity state from the media stream, and the step 1204-2 further includes calculating the estimation based on a criteria that if the verbosity state is identified, the media stream is less likely to be a nuisance.

Figure 13:
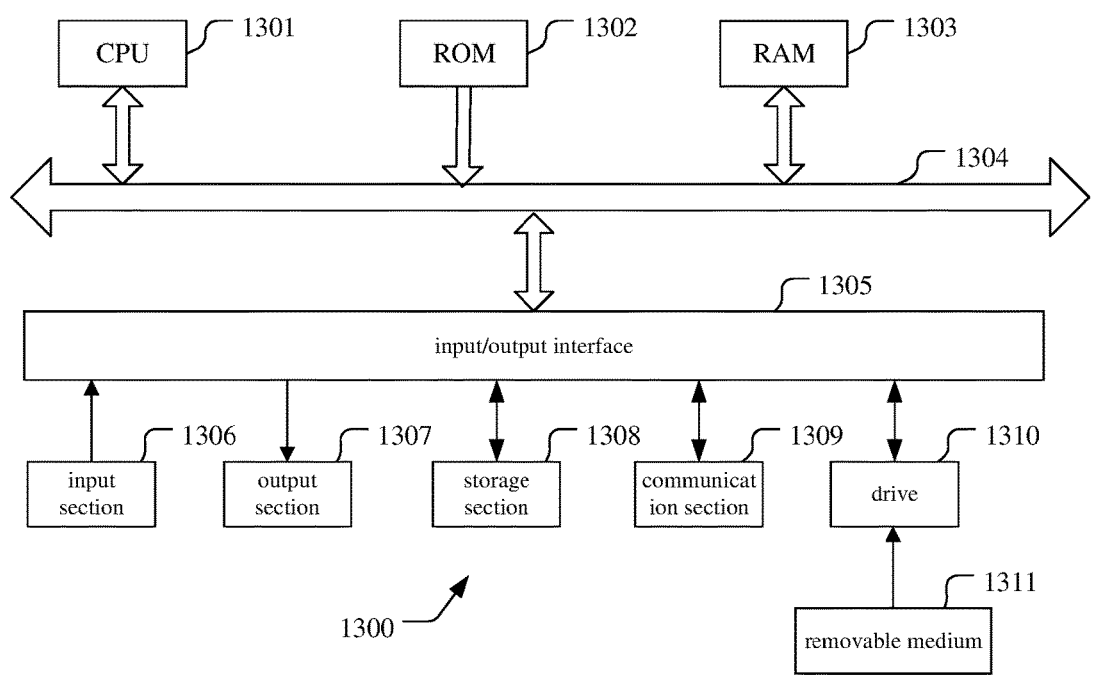
FIG. 13 is a block diagram illustrating an exemplary system for implementing the aspects of the present invention.

FIG. 13 is a block diagram illustrating an exemplary system for implementing the aspects of the present invention.

In FIG. 13, a central processing unit (CPU) 1301 performs various processes in accordance with a program stored in a read only memory (ROM) 1302 or a program loaded from a storage section 1308 to a random access memory (RAM) 1303. In the RAM 1303, data required when the CPU 1301 performs the various processes or the like is also stored as required.

The CPU 1301, the ROM 1302 and the RAM 1303 are connected to one another via a bus 1304. An input/output interface 1305 is also connected to the bus 1304.

The following components are connected to the input/output interface 1305: an input section 1306 including a keyboard, a mouse, or the like; an output section 1307 including a display such as a cathode ray tube (CRT), a liquid crystal display (LCD), or the like, and a loudspeaker or the like; the storage section 1308 including a hard disk or the like; and a communication section 1309 including a network interface card such as a LAN card, a modem, or the like. The communication section 1309 performs a communication process via the network such as the internet.

A drive 1310 is also connected to the input/output interface 1305 as required. A removable medium 1311, such as a magnetic disk, an optical disk, a magneto-optical disk, a semiconductor memory, or the like, is mounted on the drive 1310 as required, so that a computer program read therefrom is installed into the storage section 1308 as required.

In the case where the above-described steps and processes are implemented by the software, the program that constitutes the software is installed from the network such as the internet or the storage medium such as the removable medium 1311.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The following exemplary embodiments (each referred to as an "EE") are described.

EE1. An endpoint device for use in a teleconference, comprising:
an acquiring unit configured to acquire a media stream for presentation in the teleconference, and to receive information from another device, the information comprising a first estimation on whether the media stream is a nuisance to the teleconference;
a judging unit configured to decide whether the media stream is the nuisance at least based on the information;
a controller configured to control the processing of the media stream to suppress the presentation of the media stream in case that the media stream is decided as the nuisance; and
a processing unit configured to process the media stream under the control of the controller.

EE2. The endpoint device according to EE1, wherein the acquiring unit is further configured to acquire information on the other device's capability of detecting the nuisance, which can determine the weight of the other device's estimation in the decision made by the judging unit.

EE3. The endpoint device according to EE1, wherein the media stream is captured by another endpoint device, and the device further comprises:
a detector configured to calculate a second estimation on whether the media stream is a nuisance to the teleconference based on at least one of the signal quality and the transmission loss, and
a transmitter configured to transmit the second estimation to another device in the teleconference.

EE4. The endpoint device according to EE3, wherein the media stream comprises an audio stream and a video stream, and the detector is further configured to
derive at least one feature from segments in order of seconds or minutes of the audio stream and the video stream and/or to identify at least one event occurring in the media stream, and
to calculate the second estimation based on at least one of the signal quality and the transmission loss, as well as at least one of the feature and the event, and
wherein the judging unit is further configured to decide whether the media stream is the nuisance at least based on the information and the second estimation.

EE5. The endpoint device according to EE1, wherein the media stream is captured by the endpoint device, and the media stream comprises an audio stream and a video stream, and the device further comprises a detector configured to
derive at least one feature from segments in order of seconds or minutes of the audio stream and the video stream and/or to identify at least one event occurring in the media stream, and to calculate a second estimation on whether the media stream is a nuisance to the teleconference based on at least one of the feature and the event, and wherein the judging unit is further configured to decide whether the media stream is the nuisance at least based on the information and the second estimation.

EE6. The endpoint device according to EE1, wherein the suppressing comprises one of disabling the presentation, degrading at least one of presenting characteristics and discarding the media stream.

EE7. The endpoint device according to EE4 or EE5, wherein the detector is further configured to identify a verbosity state from the media stream, and to calculate the second estimation based on a criteria that if the verbosity state is identified, the media stream is less likely to be a nuisance.

EE8. A method of handling nuisance in an endpoint device for use in a teleconference, comprising:

acquiring a media stream for presentation in the teleconference, and to receive information from another device, the information comprising a first estimation on whether the media stream is a nuisance to the teleconference;

deciding whether the media stream is the nuisance at least based on the information;

controlling the processing of the media stream to suppress the presentation of the media stream in case that the media stream is decided as the nuisance; and processing the media stream under the control.

EE9. The method according to EE8, wherein the step of acquiring further comprises acquiring information on the other device's capability of detecting the nuisance, which can determine the weight of the other device's estimation in the step of deciding.

EE10. The method according to EE8, wherein the media stream is captured by another endpoint device, and the method further comprises:

calculating a second estimation on whether the media stream is a nuisance to the teleconference based on at least one of the signal quality and the transmission loss, and transmitting the second estimation to another device in the teleconference.

EE11. The method according to EE10, wherein the media stream comprises an audio stream and a video stream, and the step of calculating the second estimation further comprises:

deriving at least one feature from segments in order of seconds or minutes of the audio stream and the video stream and/or to identify at least one event occurring in the media stream, and calculating the second estimation based on at least one of the signal quality and the transmission loss, as well as at least one of the feature and the event, and wherein the step of deciding further comprises deciding whether the media stream is the nuisance at least based on the information and the second estimation.

EE12. The method according to EE8, wherein the media stream is captured by the endpoint device, and the media stream comprises an audio stream and a video stream, and the method further comprises:

deriving at least one feature from segments in order of seconds or minutes of the audio stream and the video stream and/or to identify at least one event occurring in the media stream, and calculating a second estimation on whether the media stream is a nuisance to the teleconference based on at least one of the feature and the event, and wherein the step of deciding further comprises deciding whether the media stream is the nuisance at least based on the information and the second estimation.

EE13. The method according to EE8, wherein the suppressing comprises one of disabling the presentation, degrading at least one of presenting characteristics and discarding the media stream.

EE14. The method according to EE11 or EE12, wherein step of identifying event comprises identifying a verbosity state from the media stream, and the step of calculating the second estimation further comprises calculating the second estimation based on a criteria that if the verbosity state is identified, the media stream is less likely to be a nuisance.

EE15. A server for use in a teleconference, comprising:

a receiver configured to receive an estimation on whether a media stream is a nuisance to the teleconference from each of at least one endpoint device which receives the media stream;

a voting unit configured to calculate a final estimation as the voting result by considering the estimation as a vote by each of the at least one endpoint device; and a transmitter configured to transmit the final estimation to each endpoint device in the teleconference.

EE16. The server according to EE15, further comprising:

a detector configured to:

derive at least one feature from segments in order of seconds or minutes of the audio stream and the video stream, and/or to identify at least one event occurring in the media stream, and calculate an estimation on whether the media stream is a nuisance to the teleconference based on at least one of the feature and the event, as the vote by the server; and the voting unit is further configured to calculate the final estimation as the voting result by considering the votes of the at least one endpoint device and the server.

EE17. The server according to EE15, wherein the voting unit is further configured to acquire information on capability of detecting the nuisance of the endpoint device from which the estimation is received, and assign a weight to the estimation in the decision made by the judging unit, according to the information.

EE18. The server according to EE16, wherein the detector is further configured to identify a verbosity state from the media stream, and to calculate the estimation based on a criteria that if the verbosity state is identified, the media stream is less likely to be a nuisance.

EE19. A method of handling nuisance in a server for use in a teleconference, comprising:

receiving an estimation on whether a media stream is a nuisance to the teleconference from each of at least one endpoint device which receives the media stream;

calculating a final estimation as the voting result by considering the estimation as a vote by each of the at least one endpoint device; and transmitting the final estimation to each endpoint device in the teleconference.

EE20. The method according to EE19, further comprising:

deriving at least one feature from segments in order of seconds or minutes of the audio stream and the video stream, and/or to identifying at least one event occurring in the media stream; and calculating an estimation on whether the media stream is a nuisance to the teleconference based on at least one of the feature and the event, as the vote by the server, and the step of calculating the final estimation further comprises calculating the final estimation as the voting result by considering the votes of the at least one endpoint device and the server.

EE21. The method according to EE19, wherein the step of calculating the final estimation further comprises:

acquiring information on capability of detecting the nuisance of the endpoint device from which the estimation is received, and assigning a weight to the estimation in the decision made by the judging unit, according to the information.

EE22. The method according to EE20, wherein the step of identifying event further comprises identifying a verbosity state from the media stream, and the step of calculating the estimation further comprises calculating the estimation based on a criteria that if the verbosity state is identified, the media stream is less likely to be a nuisance.

We claim:

1. An endpoint device for use in a teleconference, comprising:
an acquiring unit configured to acquire a media stream for presentation in the teleconference, and to receive information from another device that has received the media stream for presentation and that provides the information to the endpoint device as feedback on whether the media stream is a nuisance to the teleconference, the information comprising a first estimation on whether the media stream is the nuisance to the teleconference, wherein the media stream comprises an audio stream and a video stream;
a detector configured to:
derive at least one of a feature, from segments in order of seconds or minutes of the media stream, and an event occurring in the media stream; and
calculate a second estimation on whether the media stream is the nuisance to the teleconference based on at least one of a signal quality and a transmission loss, as well as the derived at least one of the feature and the event; and
at least one processing unit, memory, and instructions executable on the at least one processing unit to:
decide whether the media stream is the nuisance at least based on the first estimation by the other device and the second estimation; and
process the media stream to perform one of disabling the presentation of the media stream, degrading at least one of presenting characteristics, and discarding the media stream, in response to deciding that the media stream is the nuisance.

2. The endpoint device according to claim 1, wherein the acquiring unit is further configured to acquire information on a capability of the other device to detect the nuisance, which can determine a weight of the first estimation by the other device in the deciding whether the media stream is the nuisance.

3. The endpoint device according to claim 1, wherein the media stream is captured by another endpoint device, and the device further comprises:
a transmitter configured to transmit the second estimation to another device in the teleconference.

4. The endpoint device according to claim 1, wherein the media stream is captured by the endpoint device.

5. The endpoint device according to claim 4, further comprising instructions executable on the processing unit to identify a verbosity state from the media stream, and to calculate the second estimation based on one or more criteria that if the verbosity state is identified, the media stream is less likely to be the nuisance, wherein the verbosity state is a state in which a speaker participating in the teleconference has been actively speaking over a predetermined period of time.

6. A method of handling nuisance in an endpoint device for use in a teleconference, comprising:
acquiring a media stream for presentation in the teleconference, and to receive information from another device that has received the media stream for presentation and that provides the information to the endpoint device as feedback on whether the media stream is the nuisance to the teleconference, the information comprising a first estimation on whether the media stream is a nuisance to the teleconference, wherein the media stream comprises an audio stream and a video stream;
deriving at least one of a feature, from segments in order of seconds or minutes of the media stream, and at least one event occurring in the media stream;
calculating a second estimation on whether the media stream is the nuisance to the teleconference based on at least one of a signal quality and a transmission loss, as well as the derived at least one of the feature and the event;
deciding whether the media stream is the nuisance at least based on the first estimation by the other device and the second estimation; and
processing the media stream to perform one of disabling the presentation of the media stream, degrading at least one of presenting characteristics, and discarding the media stream, in response to deciding that the media stream is the decided as the nuisance.

7. The method according to claim 6, wherein the step of acquiring further comprises acquiring information on a capability of the other device to detect the nuisance, which can determine a weight of the first estimation by the other device in the step of deciding.

8. The method according to claim 6, wherein the media stream is captured by another endpoint device, and the method further comprises:
transmitting the second estimation to another device in the teleconference.

9. The method according to claim 6, wherein the media stream is captured by the endpoint device.

10. The method according to claim 9, wherein step of identifying event comprises identifying a verbosity state from the media stream, and the step of calculating the second estimation further comprises calculating the second estimation based on one or more criteria that if the verbosity state is identified, the media stream is less likely to be the nuisance, wherein the verbosity state is a state in which a speaker participating in the teleconference has been actively speaking over a predetermined period of time.

11. A server for use in a teleconference, comprising:
a receiver configured to receive an estimation on whether a media stream is a nuisance to the teleconference from each of at least one endpoint device which receives the media stream;
a first processor configured to calculate a final estimation as a voting result by considering the estimation as a vote by each of the at least one endpoint device;

a second processor configured to:
  derive at least one of a feature, from segments in order of seconds or minutes of the media stream, and at least one event occurring in the media stream, and
  calculate an estimation on whether the media stream is a nuisance to the teleconference based on at least one of the feature and the event, as the vote by the server, where the first processor is further configured to calculate a final estimation as a voting result by considering the votes of the at least one endpoint device and the server; and
a transmitter configured to transmit the final estimation to each endpoint device in the teleconference.

12. The server according to claim 11, wherein the media stream comprises an audio stream and a video stream.

13. The server according to claim 11, wherein the processor is further configured to
  acquire information on capability of detecting the nuisance of the endpoint device from which the estimation is received, and
  assign a weight to the estimation, according to the information.

14. The server according to claim 11, wherein the second processor is further configured to identify a verbosity state from the media stream, and to calculate the estimation based on one or more criteria that if the verbosity state is identified, the media stream is less likely to be the nuisance, wherein the verbosity state is a state in which a speaker participating in the teleconference has been actively speaking over a predetermined period of time.

15. A method of handling nuisance in a server for use in a teleconference, comprising:
  receiving first estimations on whether a media stream is a nuisance to the teleconference from each of at least one endpoint device which receives the media stream;
  deriving at least one of a feature, from segments in order of seconds or minutes of the media stream, and an event occurring in the media stream;
  calculating a second estimation on whether the media stream is a nuisance to the teleconference based on at least one of the feature and the event, as a vote by the server;
  calculating a final estimation as a voting result by considering the first estimations as votes by each endpoint device and the vote by the server; and
  transmitting the final estimation to each endpoint device in the teleconference.

16. The method according to claim 15, the media stream including an audio stream and a video stream.

17. The method according to claim 15, wherein the step of calculating the final estimation further comprises:
  acquiring information on capability of detecting the nuisance of the endpoint device from which the estimation is received, and
  assigning a weight to the estimation, according to the information.

18. The method according to claim 15, wherein the step of identifying event further comprises identifying a verbosity state from the media stream, and
  the step of calculating the estimation further comprises calculating the estimation based on one or more criteria that if the verbosity state is identified, the media stream is less likely to be the nuisance, wherein the verbosity state is a state in which a speaker participating in the teleconference has been actively speaking over a predetermined period of time.

* * * * *